US008315830B2

(12) United States Patent
Martin et al.

(10) Patent No.: US 8,315,830 B2
(45) Date of Patent: Nov. 20, 2012

(54) ON-CHIP VARIATION, SPEED AND POWER REGULATOR

(75) Inventors: Richard P. Martin, Macungie, PA (US); Richard Muscavage, Gilbersville, PA (US); Scott A. Segan, Allentown, PA (US)

(73) Assignee: Agere Systems LLC, Allentown, PA (US)

( * ) Notice: Subject to any disclaimer, the term of this patent is extended or adjusted under 35 U.S.C. 154(b) by 1113 days.

(21) Appl. No.: 11/970,597

(22) Filed: Jan. 8, 2008

(65) Prior Publication Data

US 2009/0177442 A1 Jul. 9, 2009

(51) Int. Cl.
*G06F 11/30* (2006.01)
*G06F 11/00* (2006.01)

(52) U.S. Cl. .......... 702/84; 702/142; 702/117; 702/193; 714/47.2; 714/734

(58) Field of Classification Search ............... 702/84, 702/186, 117, 118, 142, 193
See application file for complete search history.

(56) References Cited

U.S. PATENT DOCUMENTS

| | | | | |
|---|---|---|---|---|
| 5,099,196 A | * | 3/1992 | Longwell et al. | 324/537 |
| 5,818,250 A | * | 10/1998 | Yeung et al. | 324/762.02 |
| 5,847,552 A | * | 12/1998 | Brown | 323/281 |
| 6,657,504 B1 | * | 12/2003 | Deal et al. | 331/57 |
| 7,472,033 B1 | * | 12/2008 | D'Souza et al. | 702/117 |
| 2002/0084797 A1 | * | 7/2002 | Samaan | 324/765 |
| 2002/0129293 A1 | * | 9/2002 | Hutton et al. | 713/500 |
| 2005/0114056 A1 | * | 5/2005 | Patel et al. | 702/75 |
| 2007/0006012 A1 | * | 1/2007 | Mosur et al. | 713/600 |
| 2007/0266263 A1 | * | 11/2007 | Lee et al. | 713/300 |
| 2008/0094053 A1 | * | 4/2008 | Han et al. | 324/76.39 |

OTHER PUBLICATIONS

Joseph Sinohin Panganiban, "A Ring Oscillator Based Variation Test Chip," masters thesis abstract, Massachusetts Institute of Technology, Jun. 2002, pp. 1-3.

* cited by examiner

*Primary Examiner* — Hal Wachsman

(57) ABSTRACT

Operational speed of an integrated circuit chip is measured using one or more speed measurement elements, such as ring oscillators, disposed at various regions of the chip. Each speed measuring element can include several ring oscillators, each corresponding to a different technology threshold voltage. The speed measurement data collected from the speed measurement elements can be used to determine on-chip variation (OCV). Circuitry either on the chip itself or, alternatively, external to the chip can adjust a chip operational parameter, such as core voltage or clock speed, in response to the speed measurement data. Speed measurement data can be read out of the chip through JTAG pins or an interface to an external host.

15 Claims, 5 Drawing Sheets

US 8,315,830 B2

ON-CHIP VARIATION, SPEED AND POWER REGULATOR

TECHNICAL FIELD OF THE INVENTION

The invention relates generally to integrated circuit chip testing and, more specifically, to chips having speed measurement elements for measuring on-chip variation (OCV).

BACKGROUND OF THE INVENTION

Undesired variation in an integrated circuit chip fabrication process can affect chip performance and manufacturing yield. For example, if one or more physical dimensions of a transistor, such as the width of the gate portion or thickness of an oxide layer, varies from the ideal or as-designed value, the transistor may be unable to operate at the designed-for speed. Such "slow" transistors can hamper chip performance. Slow transistors or other elements are generally localized in regions of the chip (somewhat colloquially referred to as "slow silicon") that were subjected to undesired process variation. In other words, some areas of a chip may perform better than other areas.

"On-chip variation" (OCV) refers to performance variation among localized areas of a chip as a result of fabrication process factors or operating conditions (e.g., temperature, voltage, etc.). It is desirable to measure OCV so that it can be determined whether the chip is even usable for its intended purpose and, if so, at what speeds it can be reliably operated and under what conditions.

OCV has been measured using ring oscillators that have been included in the chip specifically to measure frequencies, i.e., speeds, at which the chip can operate. A ring oscillator is a well-known device that generally comprises a number of inverters interconnected in a cascaded or ring configuration. A ring oscillator can be used to measure OCV because it oscillates at a frequency that is dependent upon the characteristics and dimensions of the inverters as fabricated (as well as operating conditions such as temperature and voltage). Measuring and comparing the oscillation frequencies or speeds of a number of identically configured ring oscillators located at different areas on the chip can indicate variations among those areas. However, difficulties in using ring oscillators to measure OCV include that a frequency measurement is susceptible to adverse effects of noise and also is not the type of measurement that can be registered readily on a chip and output to external test equipment where it can be analyzed.

SUMMARY

The invention relates to integrated circuit chips and methods for measuring and using operational speed of an integrated circuit chip. Chip speed measurement data can be used to determine on-chip variation (OCV), power requirements, or other factors. Also, circuitry either on the chip itself or external to the chip can adjust a chip operational parameter, such as core voltage or clock speed, in response to the speed measurement data.

A chip in accordance with an exemplary embodiment of the invention can comprise a plurality of speed measurement elements distributed about an operational area of the chip. Each speed measurement element can comprise a plurality of oscillators, such as ring oscillators, where each oscillator of the plurality has a technology threshold different from technology thresholds of all other oscillators of the plurality. For example, each speed measurement element can have three ring oscillators: a first having a Standard Voltage Threshold (SVT), a second having a Low Voltage Threshold (LVT), and a third having a High Voltage Threshold (HVT), in accordance with the standard meanings of the terms SVT, LVT and HVT as understood by persons skilled in the art to which the invention relates.

The chip can further include an interface element coupled to the speed measurement elements for communicating speed measurement data from the chip to an external, i.e., off-chip, device, such as a processor. The interface element can comprise a JTAG controller or, alternatively, a bus interface or other means for interfacing with an external host processor system. The external device can, for example, adjust the above-mentioned chip operational parameter in response to the speed measurement data. For example, an external host processor system can adjust a voltage regulator to decrease chip core voltage and thus chip speed if, at the designed-for or nominal voltage, the chip is operating faster than a desired operational speed, thereby avoiding unnecessary power consumption.

DETAILED DESCRIPTION OF AN ILLUSTRATIVE EMBODIMENT

Figure 1:
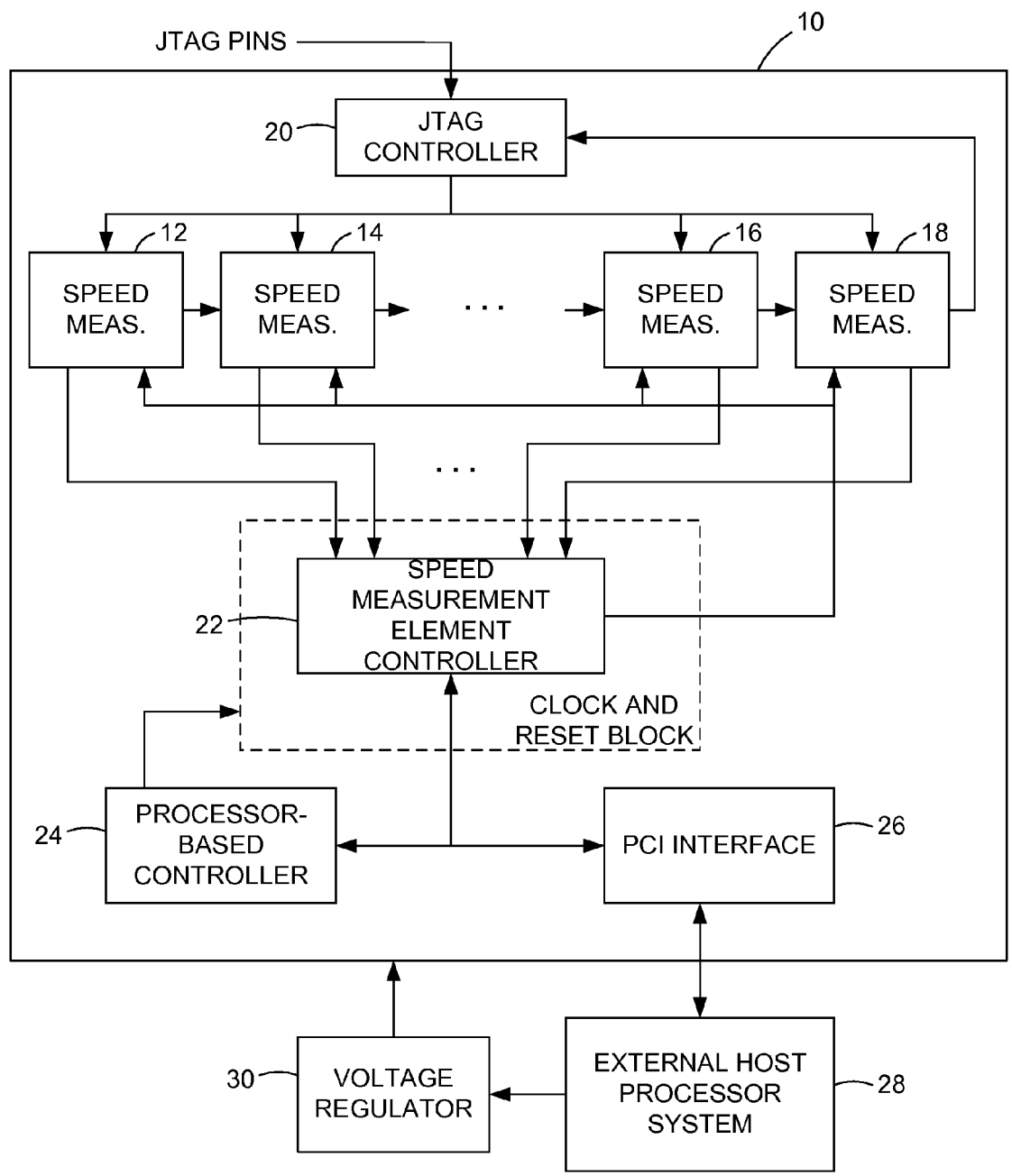
FIG. 1 is a block diagram of a chip having chip speed-measuring circuitry, along with an associated external system for receiving and using the measured chip speed, in accordance with an exemplary embodiment of the present invention.

As illustrated in FIG. 1, in an illustrative or exemplary embodiment of the invention, an integrated circuit chip 10 includes a number of speed measurement elements 12, 14, 16, 18, etc., and associated control circuitry such as a Joint Test Action Group (JTAG) controller 20 or, alternatively or in addition, a speed measurement element controller 22 and a processor-based controller 24. As described below in further detail, speed measurement elements 12, 14, 16, 18, etc., include conventional ring oscillators that oscillate at whatever frequency at which they are capable of oscillating in view of the characteristics and dimensions of their constituent elements resulting from the fabrication process and operating conditions such as temperature and voltage. Chip 10 can further include a bus interface, such as a Peripheral Component Interconnect (PCI) interface 26, for communicating data between chip 10 and devices or systems external to chip 10, such as an external host processor system 28.

JTAG controller 20 is a standard chip element, well known to persons skilled in the art to which the invention relates and therefore not described in further detail herein. Conventionally, such a JTAG controller is used to test the chip circuitry to which it is coupled. JTAG controller 20 can be operated in the conventional manner through dedicated JTAG pins (not shown) provided on chip 10 to send data to and receive data from JTAG controller 20 and, in turn, to and from circuitry on chip 10 to which JTAG controller 20 is coupled.

Processor-based controller 24 can likewise be of conventional design, based upon a processor of the type available under license from ARM, Limited of Cambridge, United Kingdom. Such ARM processors are commonly used as core processors in application-specific integrated circuits (ASICs). Accordingly, their integration in chip designs, operation and use are well understood by persons of skill in the art. In the exemplary embodiment of the invention, processor-based controller 24 can be used as described below to control a suitable chip parameter, such as clock speed.

PCI interface 26 is similarly of conventional design, well understood by persons of skill in the art, and therefore not described in further detail herein. As described below, one exemplary use of PCI interface 26 is to output the measured speed data to an external host processor system 30, which in response can adjust a voltage regulator 30 to change the core voltage applied to chip 10. Although in the exemplary embodiment of the invention host processor system 30 controls core voltage, in other embodiments such an external host processor system can be used to control any other suitable chip parameter.

Chip 10 can be fabricated using any suitable conventional photolithographic processes on a suitable wafer (e.g., silicon) substrate. Accordingly, references herein to circuitry or other elements of chip 10 are intended to mean elements formed on the chip substrate using such processes. As the processes by which such elements can be formed and chip 10 can otherwise be fabricated are well understood by persons of ordinary skill in the art to which the invention relates, they are not described in further detail herein.

Speed measurement elements 12, 14, 16, 18, etc., can be distributed throughout the operational areas or regions of chip 10 where it is desired to measure the operational speed. For example, there can be eight such elements (not all of which are shown for purposes of clarity, as indicated by the ellipsis " . . . " symbol) evenly distributed about such regions so that the operational speed of each region can be determined independently. If any regions of so-called "slow silicon" are detected, thus indicating on-chip variation (OCV), that information can be used, for example, as feedback to improve fabrication processes to minimize such instances, or for any other suitable purposes, such as those described below. Although eight measurement elements 12, 14, 16, 18, etc., are contemplated in the exemplary embodiment of the invention, other embodiments can have fewer or more such elements.

It should be noted that the above-described elements of chip 10 are included in addition to whatever other basic elements (not shown for purposes of clarity) chip 10 may include that relate to its primary or intended function as part of a commercial end product. In other words, chip 10 can be based upon any conventional chip design that is known in the art to which the invention relates or that would occur to a person skilled in the art; the chip elements described herein relating to the present invention augment or supplement other basic chip elements that relate to the chip's primary or intended end-product function. Thus, the above-described elements can be distributed about the basic chip elements to gauge the speed capability of nearby basic chip elements.

As described below in further detail, each speed measurement element 12, 14, 16, 18, etc., can measure chip operating speed for each of a number of technology threshold voltages. Chips can include devices or elements fabricated in accordance with specified technology threshold voltages. As known in the art, a multi-threshold chip can include elements having different threshold voltages corresponding to the array of "technologies" the chip foundry is capable of fabricating on the same chip. Using electronic design tools that allow a designer to specify technology thresholds, a designer can use such foundry-specified threshold voltages to optimize a design. For example, a designer can assign higher threshold voltage elements, which are less prone to current leakage (and thus are power-efficient) but slow, to non-critical paths and assign lower threshold voltage elements, which are fast but more prone to current leakage (and thus power-inefficient), to critical paths. In summary, the invention enables measurement of the operating speed of elements fabricated in accordance with various technology thresholds in various regions of chip 10. The conventional or standard technology thresholds specified by most foundries and accordingly provided for by electronic design tools are: Standard Voltage Threshold (SVT), Low Voltage Threshold (LVT), and High Voltage Threshold (HVT). However, the invention can be used to measure operating speeds of elements having any suitable technology thresholds.

Figure 2:
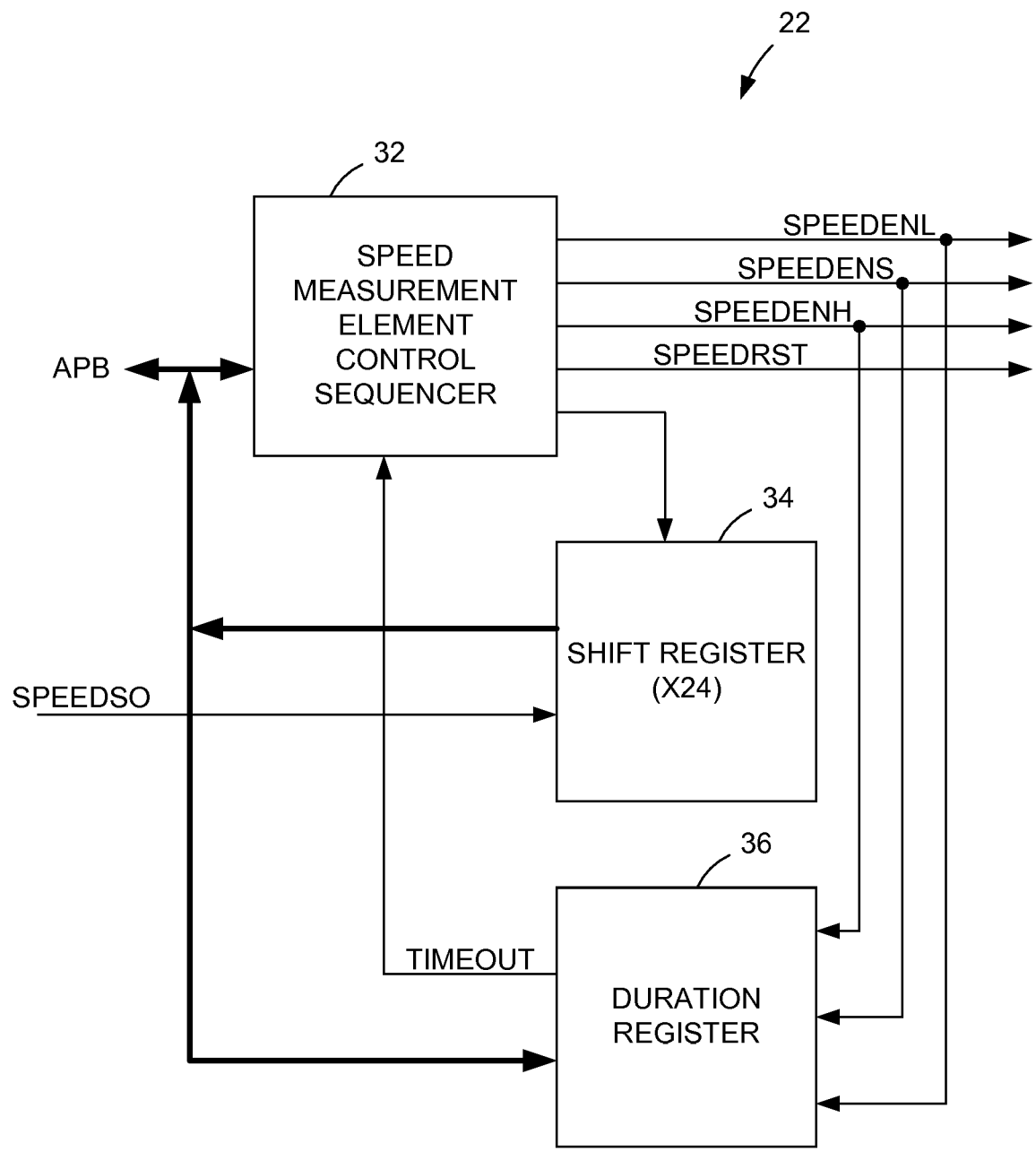
FIG. 2 is a block diagram of a controller for the speed measurement elements of the chip of FIG. 1.

Speed measurement element controller 22 is illustrated in further detail in FIG. 2 and can be included as a novel part of the otherwise-conventional clock and reset functional block that is commonly included in chip designs. Speed measurement element controller 22 comprises a speed measurement element control sequencer 32, a shift register 34, and a duration register 36. Duration register 36 is a timer that can be loaded with a duration value representing the amount of time to allow each of speed measurement elements 12, 14, 16, 18, etc., to run. At the end of that time, duration register 36 provides a timeout signal ("TIMEOUT") to speed measurement element control sequencer 32. Only one shift register 34 is shown for purposes of clarity, but in an embodiment in which there are three technology thresholds and eight speed measurement elements 12, 14, 16, 18, etc., there are actually 24 shift registers 34; eight for each of the three (SVT, LVT and HVT) technology thresholds.

Note in FIG. 1 that the speed measurement elements 12, 14, 16, 18, etc., are daisy-chained, i.e., a serial output signal of one is fed into a serial input of the next in the chain, to conserve routing resources. The serial output signal of the last speed measurement element 18 in the chain is provided to JTAG controller 20 (FIG. 1). Note that speed measurement element control sequencer 32 (FIG. 2) and duration register 36 (FIG. 2) can communicate with processor-based controller 24 (FIG. 1) via an Advanced Peripheral Bus (APB). Shift register 34 also outputs its contents via this bus.

Figure 3:
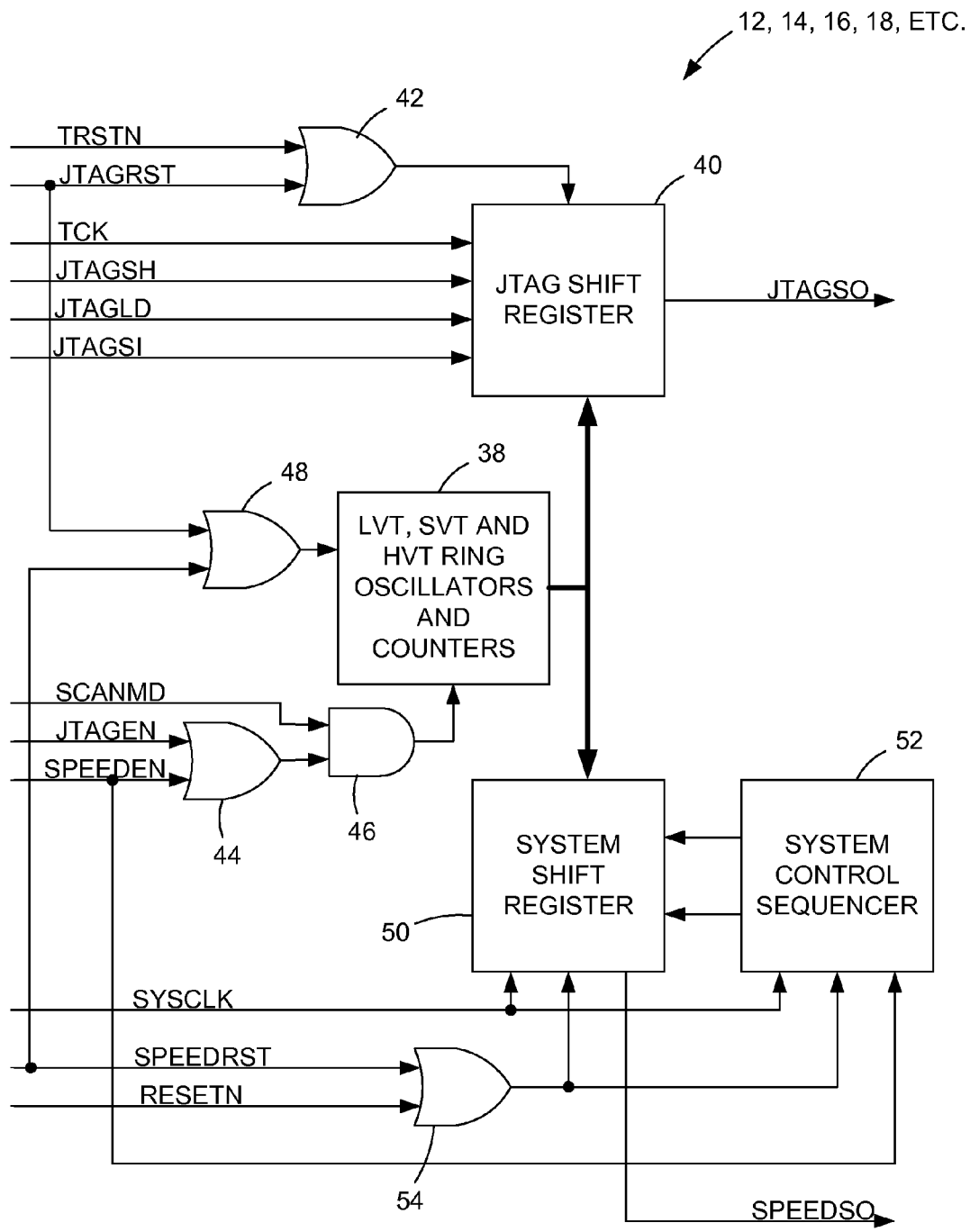
FIG. 3 is a block diagram of a speed measurement element of the chip of FIG. 1.

Each of speed measuring elements 12, 14, 16, 18, etc., can have the exemplary structure illustrated in FIG. 3. The above-mentioned three (SVT, LVT and HVT) ring oscillators, along with an associated counter for each oscillator (not separately shown for purposes of clarity), are included in an oscillator and counter element 38. As noted above, speed measuring elements 12, 14, 16, 18, etc., can be operated through either JTAG controller 20 or processor-based controller 24 (FIG. 1). Accordingly, each of speed measuring elements 12, 14, 16, 18, etc., includes inputs that receive signals from both JTAG controller 20 and processor-based controller 24. Two JTAG reset signals ("TRSTN" and "JTAGRST") are used to reset a JTAG shift register 40 through a logical-OR gate 42. JTAG shift register is clocked by a clock signal ("TCK"). A JTAG shift signal ("JTAGSH") shifts data ("JTAGSO") serially out of JTAG shift register 40 to the next speed measuring element in the chain or, ultimately, to JTAG controller 20. JTAG shift register 40 also receives the above-described serial input ("JTAGSI") from the previous one of speed measuring elements 12, 14, 16, 18, etc., in the chain. The shifted-in data represents the counts produced by the above-described counters that are clocked by the ring oscillators. A JTAG load signal ("JTAGLD") loads JTAG shift register 40 with the shifted-in data.

As indicated by the logical-OR 44 coupled to oscillator and counter block 38, either JTAG controller 20 or processor-based controller 24 can enable the ring oscillators and associated counters to run (via control signals "JTAGEN" and "SPEEDEN", respectively). Note that only one of each of these control signals and one logical-OR 44 is shown for purposes of clarity, but there is actually one such control signal for each of the three ring oscillators, as indicated in FIG. 2: "SPEEDENH", "SPEEDENS", and "SPEEDENL" A logical-AND 46 that combines the output of logical-OR 44 with a test signal ("SCANMD") is provided for purposes of testing oscillator and counter block 38 but is not otherwise relevant to the invention. Oscillator and counter block 38 can be reset through either JTAG controller 20 or processor-based controller 24, as indicated by the logical-OR 48 combining their reset signals "JTAGRST" and "SPEEDRST", respectively.

A system shift register 50 is controlled by a system control sequencer 52 that, as described in further detail below with regard to the method of operation, causes the three (SVT, LVT and HVT) ring oscillators to operate sequentially. As described below, in operation, each enabled ring oscillator clocks an associated counter. The count or output of each counter is provided to both JTAG shift register 40 and system shift register 50. These count values can then be shifted out to either speed measurement element controller 22 (via signal "SPEEDSO") or to the next speed measuring element in the chain (via signal "JTAGSO") (and ultimately from the last speed measuring element 18 in the chain to JTAG controller 20). System shift register 50 and system control sequencer 52 can be reset through the whole-chip master reset signal ("RESETN") or through the reset signal ("SPEEDRST") originating with processor-based controller 24, as indicated by the logical-OR 54 combining these reset signals. System shift register 50 and system control sequencer 52 are clocked by the whole-chip master clock signal ("SYSCLK").

Figure 4:
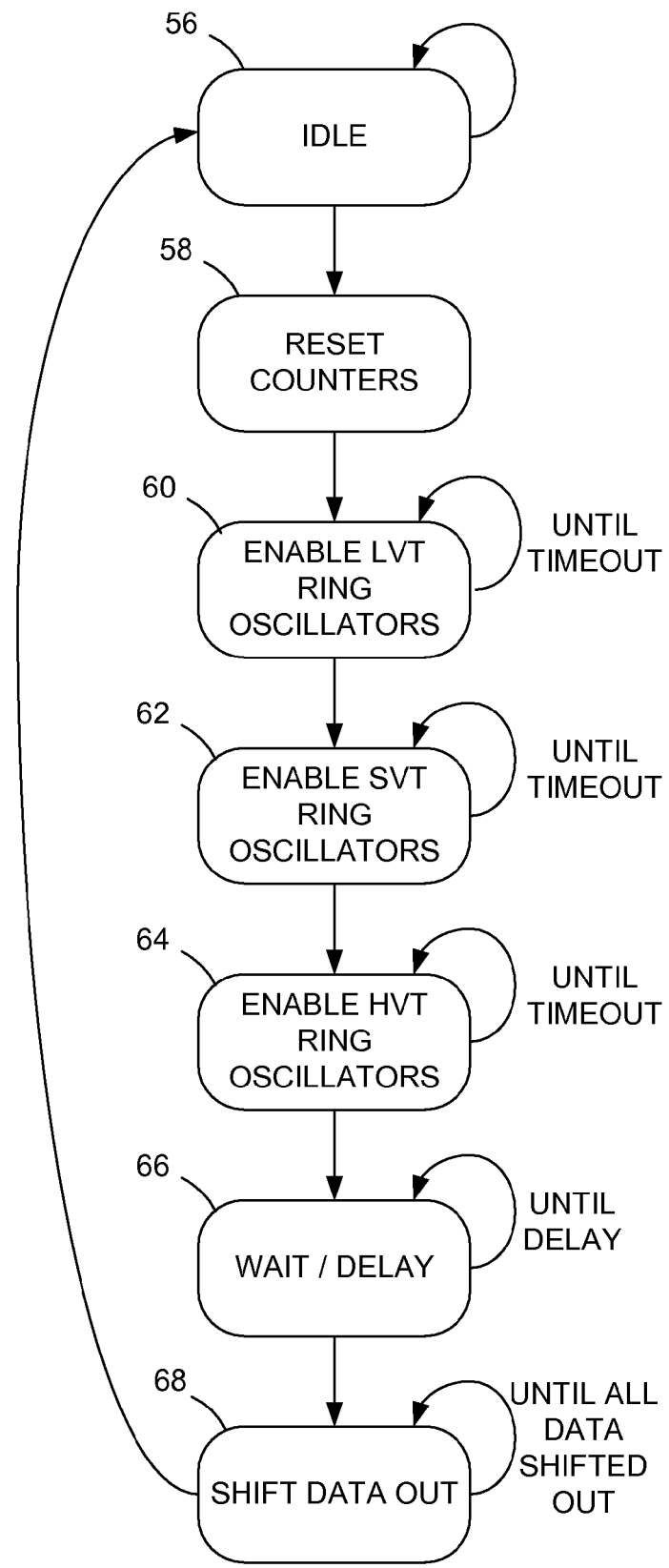
FIG. 4 is a flow diagram illustrating a method for controlling the speed measurement elements of the chip of FIG. 1 to measure chip speed.

An exemplary method by which speed measurements can be taken for each of the three technology thresholds is illustrated by the flow or state diagram of FIG. 4. With further reference to FIG. 2, speed measurement element control sequencer 32 is programmed or configured with the steps or states shown in FIG. 4. As a preliminary or initialization step (not shown in FIG. 4 for purposes of clarity), processor-based controller 24 or JTAG controller 20 (FIG. 1) programs or loads duration register 36 (FIG. 2) with a value representing the length of time it is desired to allow the ring oscillators and associated counters to count. As indicated by step 56, the system remains in an idle state, performing no actions until such time as speed measurement element control sequencer 32 receives a start command from either processor-based controller 24 or JTAG controller 20 (FIG. 1). In response to such a start command, it resets ("SPEEDRST") the three counters associated with the three ring oscillators of the oscillator and counter block 38 (FIG. 3) of each of speed measurement elements 12, 14, 16, 18, etc. (FIG. 1).

As indicated by step 60, speed measurement element control sequencer 32 enables ("SPEEDENL") the LVT ring oscillator and associated counter in each of speed measurement units 12, 14, 16, 18, etc. The LVT ring oscillators, while enabled, oscillate at whatever frequency the as-fabricated characteristics and dimensions of their constituent elements (primarily inverters) allow. This may be the designed-for frequency, or it may be higher or lower than the designed-for frequency. In any event, the LVT ring oscillators continue oscillating and clocking their associated counters until speed measurement element control sequencer 32 receives the "TIMEOUT" signal from duration register 36 (FIG. 2), indicating that the above-referenced time interval that was loaded into duration register 36 has elapsed. Upon receiving the "TIMEOUT" signal, speed measurement element control sequencer 32 proceeds to step 62, and the LVT ring oscillators and associated counters are disabled.

As indicated by step 62, speed measurement element control sequencer 32 enables ("SPEEDENS") the SVT ring oscillator and associated counter in each of speed measurement units 12, 14, 16, 18, etc. As described above with regard to the LVT ring oscillators, the SVT ring oscillators, while enabled, oscillate at whatever frequency the as-fabricated characteristics and dimensions of their constituent elements (primarily inverters) allow. The SVT ring oscillators continue oscillating and clocking their associated counters until speed measurement element control sequencer 32 receives the "TIMEOUT" signal from duration register 36 (FIG. 2), indicating that the above-referenced time interval that was loaded into duration register 36 has elapsed. Upon receiving the "TIMEOUT" signal, speed measurement element control sequencer 32 proceeds to step 64, and the SVT ring oscillators and associated counters are disabled.

As indicated by step 64, speed measurement element control sequencer 32 enables ("SPEEDENH") the HVT ring oscillator and associated counter in each of speed measurement units 12, 14, 16, 18, etc. As described above with regard to the LVT and SVT ring oscillators, the HVT ring oscillators, while enabled, oscillate at whatever frequency the as-fabricated characteristics and dimensions of their constituent elements (primarily inverters) allow. The HVT ring oscillators continue oscillating and clocking their associated counters until speed measurement element control sequencer 32 receives the "TIMEOUT" signal from duration register 36 (FIG. 2), indicating that the above-referenced time interval that was loaded into duration register 36 has elapsed. Upon receiving the "TIMEOUT" signal, speed measurement element control sequencer 32 proceeds to step 66, and the HVT ring oscillators and associated counters are disabled.

Step 66 represents a suitable delay interval that allows the contents of the counters associated with the ring oscillators to propagate through the above-described daisy-chain (see FIG. 1) as well as to be shifted into shift registers 34 (FIG. 2). Following the delay interval, at step 68 JTAG controller 20 can cause JTAG shift register 40 (FIG. 2) of the last speed measurement element 18 in the chain to shift the count data out ("JTAGSO") so that JTAG controller 20 can receive it. Similarly, processor-based controller 24 can read the count data from shift registers 34.

Personnel can use conventional external test equipment (not shown for purposes of clarity) to read the count data from JTAG controller 20 in the same manner in which JTAG data is read from a chip for conventional test purposes. The frequency or speed of each ring oscillator can be computed, either through automated means or manually, from the number of counts over the selected time interval. A speed of operation of each of the (eight, in the exemplary embodiment) speed measurement elements 12, 14, 16, 18, etc., can be computed in this manner, for each of the three technology thresholds. The information can thus indicate which regions of chip 10 are operable at the designed-for speed, and which regions are prone to operation at a speed lower than designed for or higher than designed for. The information can thus also indicate whether elements having a particular technology threshold may be more prone to operation at a speed other than the designed-for speed, and whether such behavior is localized to particular regions of chip 10.

Figure 5:
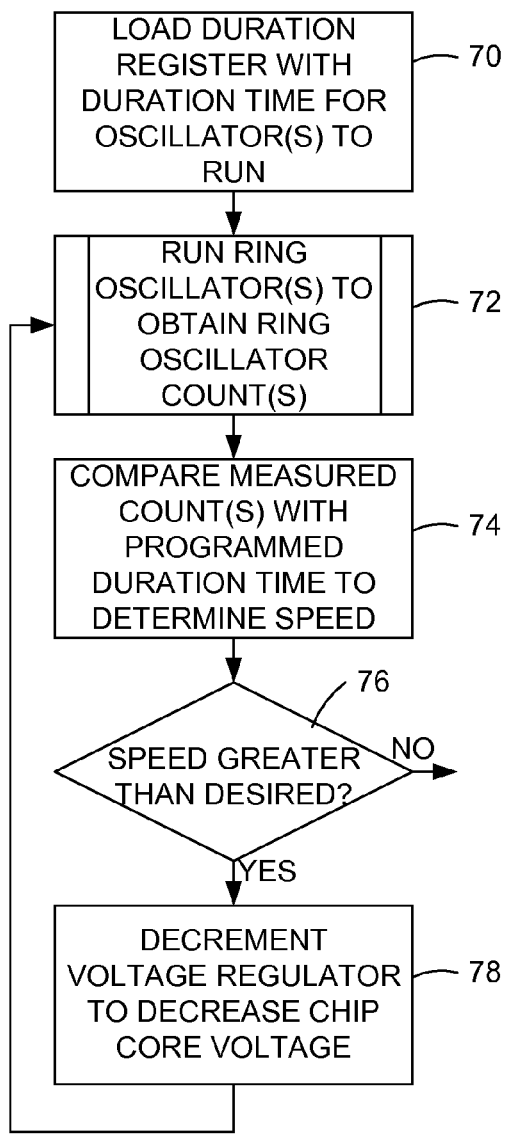
FIG. 5 is a flow diagram illustrating a method for using measured chip speed to control the core voltage applied to the chip of FIG. 1.

As illustrated in FIG. 5, an exemplary method relating to the present invention can include adjusting the core voltage applied to chip 10 in response to the above-described speed measurement data (i.e., the counts themselves, speeds computed from the counts, or other information derived from the counts). The method can be controlled by, for example, external host processor system 28 (FIG. 1). It can be performed for multiple technology thresholds (e.g., using all three ring oscillators as described above with regard to FIG. 4), or for only a single technology threshold in other embodiments.

At step 70, the above-described initialization is performed in which duration register 36 (FIG. 2) is loaded with a duration time. Step 72 represents the steps (56-68) described above with regard to FIG. 4 involved in operating the ring oscillators and otherwise generating the speed measurement data. As described above, external host processor system 28 can receive the speed measurement data via PCI interface 26 (FIG. 1) and compare the data with the duration time to compute a speed, as indicated by step 74. If, as indicated by step 76, the measured speed is greater than a predetermined speed, such as the speed at which it is desired for chip 10 to operate, then at step 78 external host processor system 28 can decrement an input to voltage regulator 30 (FIG. 1), causing it to decrease the core voltage it applies to chip 10. The logic elements of chip 10 respond to a decreased core voltage by operating at a lower speed. External host processor system 28 can repeat steps 72-78 until the measured speed reaches the predetermined speed. Note that decreasing core voltage in this manner for a chip 10 that, at the designed-for voltage, is capable of operating at a speed greater than the designed-for speed, enables chip 10 to operate at the desired speed but consume less power.

Figure 6:
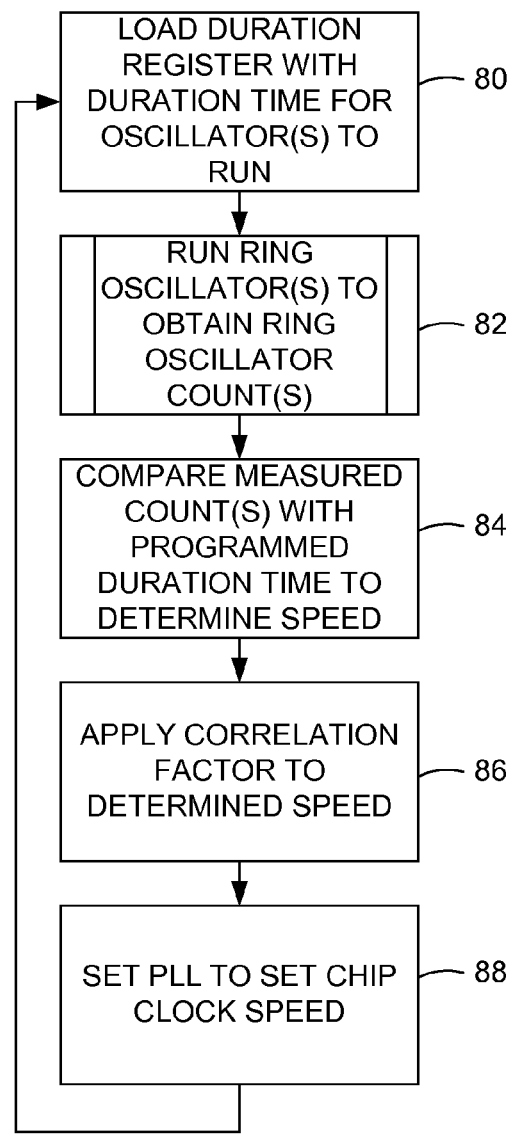
FIG. 6 is a flow diagram illustrating a method for using measured chip speed to control the master clock speed of the chip of FIG. 1.

As illustrated in FIG. 6, another exemplary method relating to the present invention can include adjusting the clock speed of chip 10 in response to the above-described speed measurement data (i.e., the counts themselves, speeds computed from the counts, or other information derived from the counts). The method can be controlled by, for example, processor-based controller 24, as indicated in FIG. 1, or in other embodiments by host processor system 28. It can be performed for multiple technology thresholds (e.g., using all three ring oscillators as described above with regard to FIG. 4), or for only a single technology threshold in other embodiments.

At step 80, the above-described initialization is performed in which duration register 36 (FIG. 2) is loaded with a duration time. Step 82 represents the steps (56-68) described above with regard to FIG. 4 involved in operating the ring oscillators and otherwise generating the speed measurement data. As described above, processor-based controller 24 can receive the speed measurement data directly from speed measurement element controller 22 and compare the data with the duration time to compute a speed, as indicated by step 84. As indicated by step 86, processor-based controller 24 can apply a correlation factor to the computed speed or speed measurement data that relates the computed speed or speed measurement data to a predetermined speed, such as a maximum operating speed of chip 10 as determined by simulations or empirical calibration trials performed at an earlier time. Applying the correlation factor yields a value to which a phase-locked loop (PLL) or similar clock generator (not shown) in the clock and reset block (FIG. 1) can be set to cause it to generate a chip-wide or master clock signal having the desired speed or frequency. Step 88 represents processor-based controller 24 setting such a clock generator (or, in other embodiments of the invention, external host 28 or other device setting such a clock generator).

It should be noted that the invention has been described with reference to one or more exemplary embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. An integrated circuit chip, comprising:
a plurality of speed measurement elements formed in the chip and distributed about an operational area of the chip, each speed measurement element comprising a plurality of oscillators, each oscillator of the plurality of oscillators having an integrated circuit fabrication technology threshold different from integrated circuit fabrication technology thresholds of all other oscillators of the plurality of oscillators;
control circuitry formed in the chip and coupled to one or more of the speed measurement elements; and
a speed-measurement controller coupled to the speed measurement elements, the speed measurement controller selecting a technology threshold, wherein all oscillators having the selected technology threshold are enabled to operate.

2. The integrated circuit chip claimed in claim 1, wherein the oscillators are ring oscillators.

3. The integrated circuit chip claimed in claim 1, wherein the control circuitry comprises an interface element for communicating speed measurement data with an off-chip device.

4. The integrated circuit chip claimed in claim 3, wherein the interface element comprises a programmable processing core.

5. The integrated circuit chip claimed in claim 3, wherein the interface element comprises a Joint Test Action Group (JTAG) controller.

6. The integrated circuit chip claimed in claim 3, wherein the speed measurement elements are daisy-chained to serially route output data from a speed measurement element through a chain of speed measurement elements to the interface element.

7. The integrated circuit chip claimed in claim 1, wherein each speed measurement element comprises:
a first ring oscillator having a Standard Voltage Threshold;
a second ring oscillator having a Low Voltage Threshold; and
a third ring oscillator having a High Voltage Threshold.

8. The integrated circuit chip claimed in claim 1, wherein the speed measurement controller comprises a sequencer, the sequencer sequentially selecting each integrated circuit fabrication technology threshold.

9. The integrated circuit chip claimed in claim 1, wherein the speed measurement controller comprises a duration register, the duration register programmable with a duration value indicating how long the oscillators are enabled to operate.

10. A method for measuring on-chip variation (OCV) in operational speed of an integrated circuit chip having a plurality of speed measurement elements and an interface element, the speed measurement elements distributed about an operational area of the chip, each speed measurement element comprising a plurality of oscillators, each oscillator of the plurality of oscillators having an integrated circuit fabrication technology threshold different from integrated circuit fabrication technology thresholds of all other oscillators of the plurality of oscillators, the method comprising:

enabling operation of an oscillator having a first integrated circuit fabrication technology threshold in each of the speed measurement elements;

generating speed measurement data resulting from the operation of the oscillators having the first integrated circuit fabrication technology threshold;

enabling operation of an oscillator having a second integrated circuit fabrication technology threshold in each of the speed measurement elements; and generating speed measurement data resulting from the operation of the oscillators having the second integrated circuit fabrication technology threshold by counting oscillation cycles.

11. The method claimed in claim 10, further comprising:

enabling operation of an oscillator having a third integrated circuit fabrication technology threshold in each of the speed measurement elements;

generating speed measurement data resulting from the operation of the oscillators having the third integrated circuit fabrication technology threshold by counting oscillation cycles;

wherein the first integrated circuit fabrication technology threshold is a Standard Voltage Threshold;

wherein the second integrated circuit fabrication technology threshold is a Low Voltage Threshold; and wherein the third integrated circuit fabrication technology threshold is a High Voltage Threshold.

12. The method claimed in claim 10, further comprising programming a duration register of the chip with a duration value indicating how long the oscillators are enabled to operate before speed measurement data resulting from the operation is generated.

13. The method claimed in claim 12, wherein:

the step of programming a duration register comprises operating a Joint Test Action Group (JTAG) controller on the chip; and further comprising the step of transmitting the speed measurement data from the chip by operating the JTAG controller.

14. The method claimed in claim 10, further comprising:

determining if the speed measurement data resulting from the operation of the oscillators having one of the first integrated circuit fabrication technology threshold and the second integrated circuit fabrication technology threshold indicates that a measured chip operational speed indicated by the speed measurement data is greater than a predetermined desired chip operational speed; and decreasing chip core voltage of the integrated circuit chip if it is determined from the speed measurement data that measured chip operational speed is greater than the predetermined desired chip operational speed.

15. The method claimed in claim 14, further comprising adjusting a chip operational parameter of the integrated circuit chip by adjusting a phase-locked loop input in response to the speed measurement data.

\* \* \* \* \*